Figure 1:
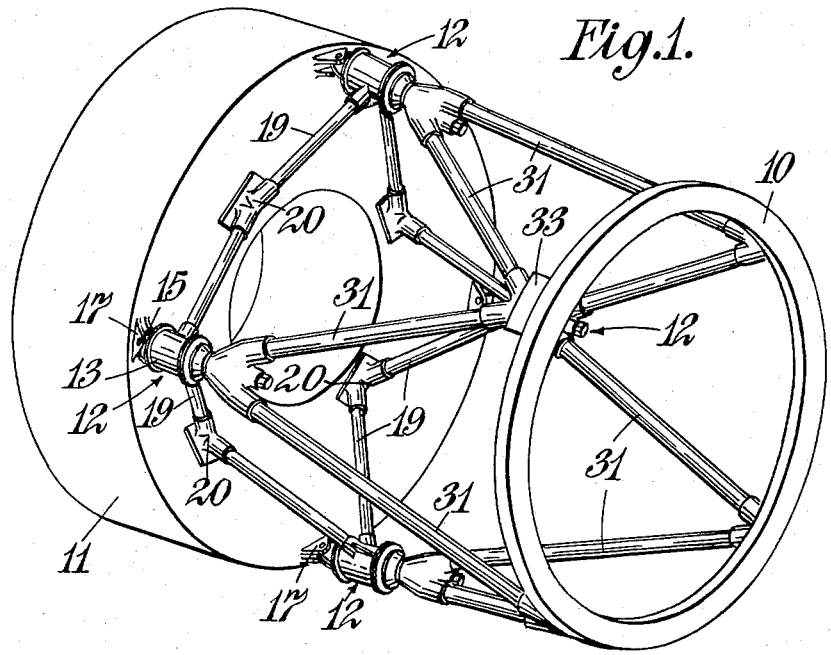

INVENTOR
DONALD McLEAN
BY Mawhinney & Mawhinney
ATTORNEYS.

Dec. 20, 1960    D. McLEAN    2,965,338
ENGINE MOUNTING
Filed April 3, 1957    4 Sheets-Sheet 2
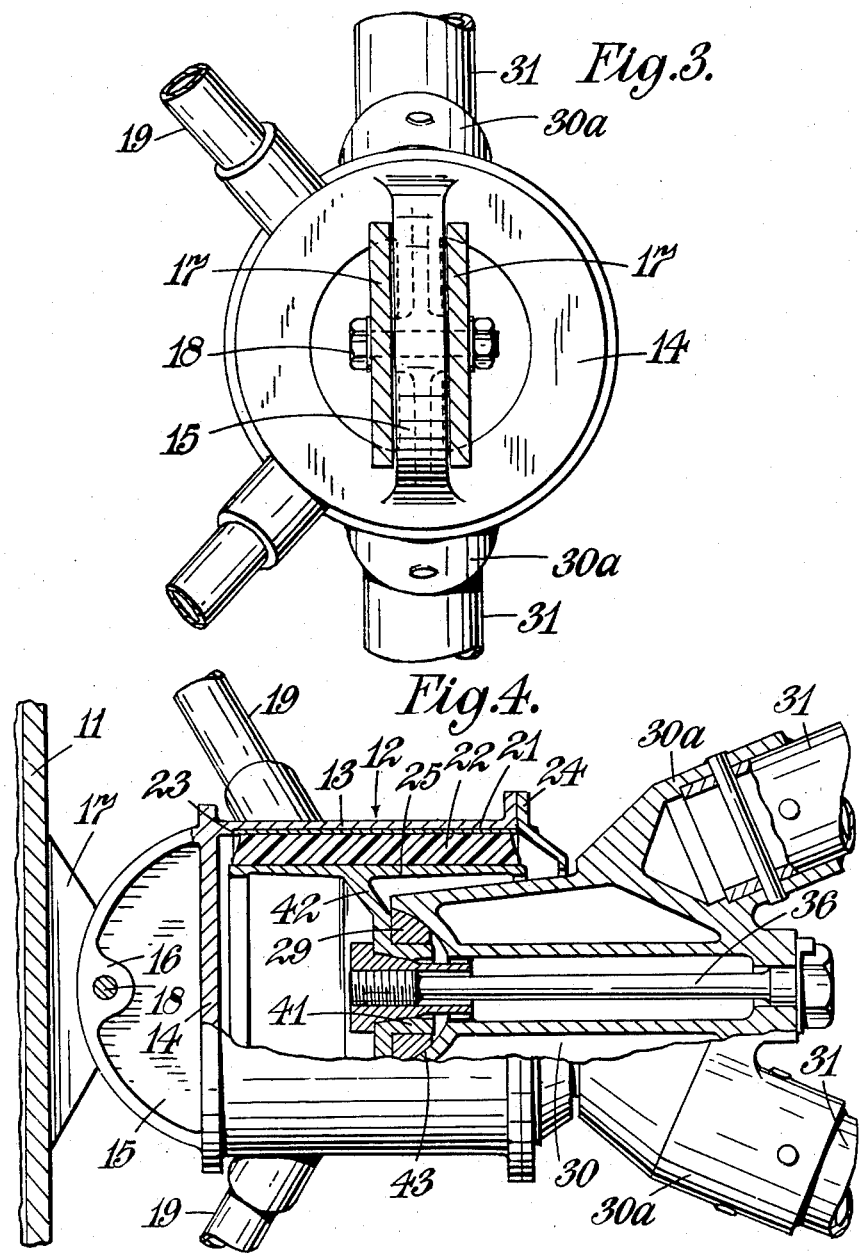
INVENTOR
DONALD McLEAN
BY Mawhinney & Mawhinney
ATTORNEYS Dec. 20, 1960 D. McLEAN 2,965,338
ENGINE MOUNTING
Filed April 3, 1957 4 Sheets-Sheet 4
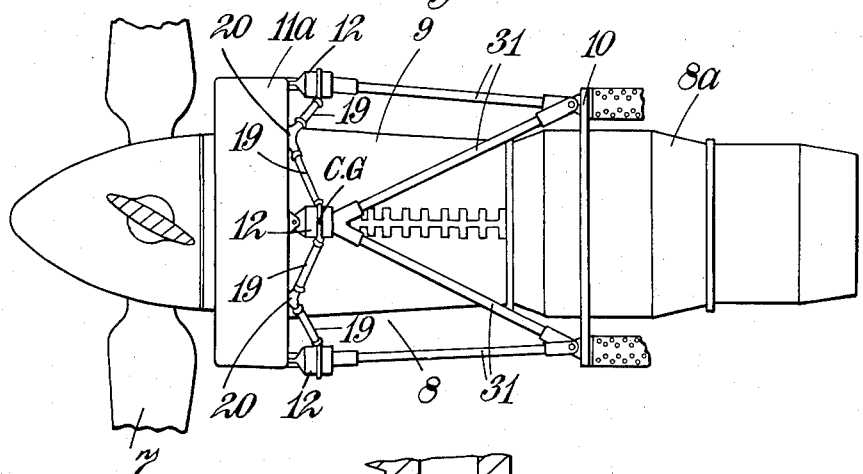
Fig. 7.
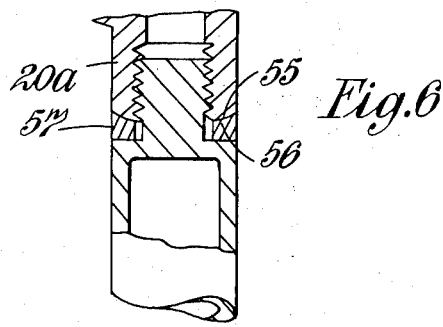
Fig. 6
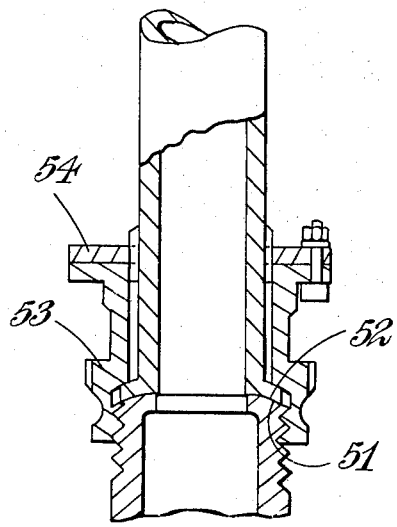
INVENTOR
DONALD McLEAN
BY Mawhinney & Mawhinney
ATTY.S United States Patent Office 2,965,338
Patented Dec. 20, 1960

2,965,338

ENGINE MOUNTING

Donald McLean, Derby, England, assignor to Rolls-Royce Limited, Derby, England, a company of Great Britain Filed Apr. 3, 1957, Ser. No. 650,417

Claims priority, application Great Britain Apr. 9, 1956

14 Claims. (Cl. 248—5)

This invention comprises improvements in or relating to engine mountings for propeller-driving engines and has for an object to provide a form of engine mounting which as adapted to absorb vibrational couples due to rotation of the engine and propeller, which is relatively light, and which is adjustable to permit accurate positioning of the engine in, say, an aircraft structure despite manufacturing variations.

According to the present invention, an engine mounting for supporting an engine in engine-supporting structure comprises at least three mounting devices intersected by a single plane transverse to the axis of the engine, the plane containing or passing adjacent to the centre of gravity of the engine and propeller combination, and the mounting devices each having a greater flexibility in the direction parallel to the engine axis than in the transverse direction, thereby to allow angular movement of the engine about the point of intersection of its axis and the transverse plane, and to resist other movement of the engine.

According to a feature of the present invention, each mounting device may comprise a first sleeve member having its axis extending parallel to the engine axis, which sleeve member is pivoted at one end to the engine and is also connected to the engine through a pair of links, each of which links is adjustable in length and has part-spherical connections at each end with the sleeve member and with the engine respectively, a second sleeve member coaxial with the first sleeve member and connected thereto through an annular bushing of elastomeric material which is bonded to both sleeve members, said second sleeve member being rigidly connected to the engine supporting structure through parts on the sleeve member and the engine structure having co-operating part-spherical surfaces whereof the centres are on the axis of the second sleeve member and through clamping means which when operative holds the co-operating part-spherical surfaces in firm abutment.

Preferably, in constructions according to the above feature, there are four such mounting devices distributed equi-angularly about the engine axis and the links associated with each first sleeve member from the first sleeve member one towards each adjacent mounting device. Conveniently the engine carries a bracket intermediate each pair of adjacent mounting devices, to which bracket one link from each of the pair of adjacent mounting devices is connected through the part-spherical connection.

According to a feature of this invention, there may also be provided adjusting means to vary the position of the second sleeve member axially of itself relative to the engine supporting structure. In one form this means comprises an adjusting washer of selected thickness disposed between an axially-facing shoulder on the engine supporting structure and a part-spherical-surfaced collar affording one of the part-spherical-surfaced parts, and the clamping means is adapted to urge the part-spherical-surfaced parts axially of the second sleeve member into contact, the collar into abutment with the washer and the washer into abutment with the shoulder.

With a particular construction of mounting according to this invention, the position of the first sleeve member relative to the engine can be accurately adjusted by varying the lengths of the links, and the form of connection between the second sleeve members and the engine supporting structure permits the second sleeve members to be accurately adjusted in position so that the centres of their part-spherical joints are coplanar, while the part-spherical joints permit the second sleeve members to be adjusted so that their axes are parallel.

Figure 2:
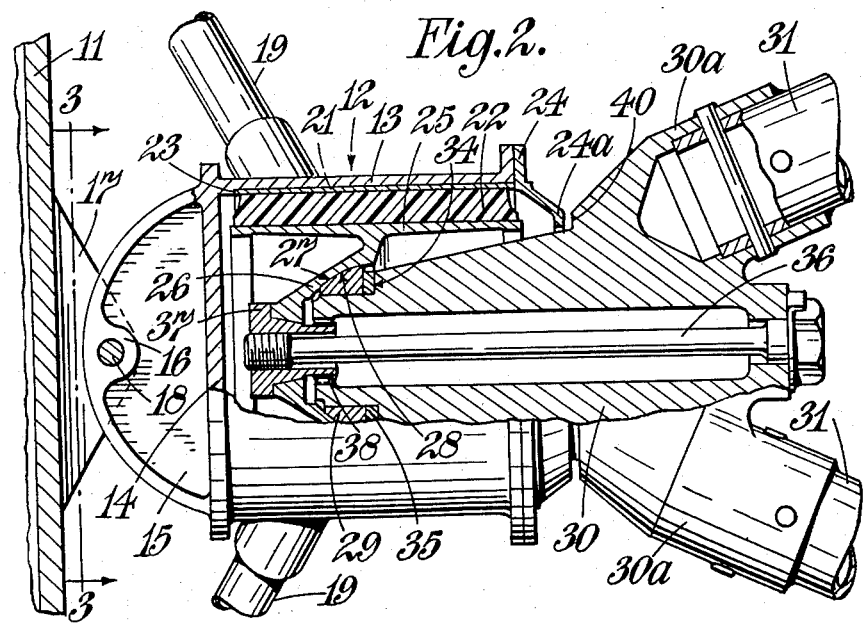
Figure 5:
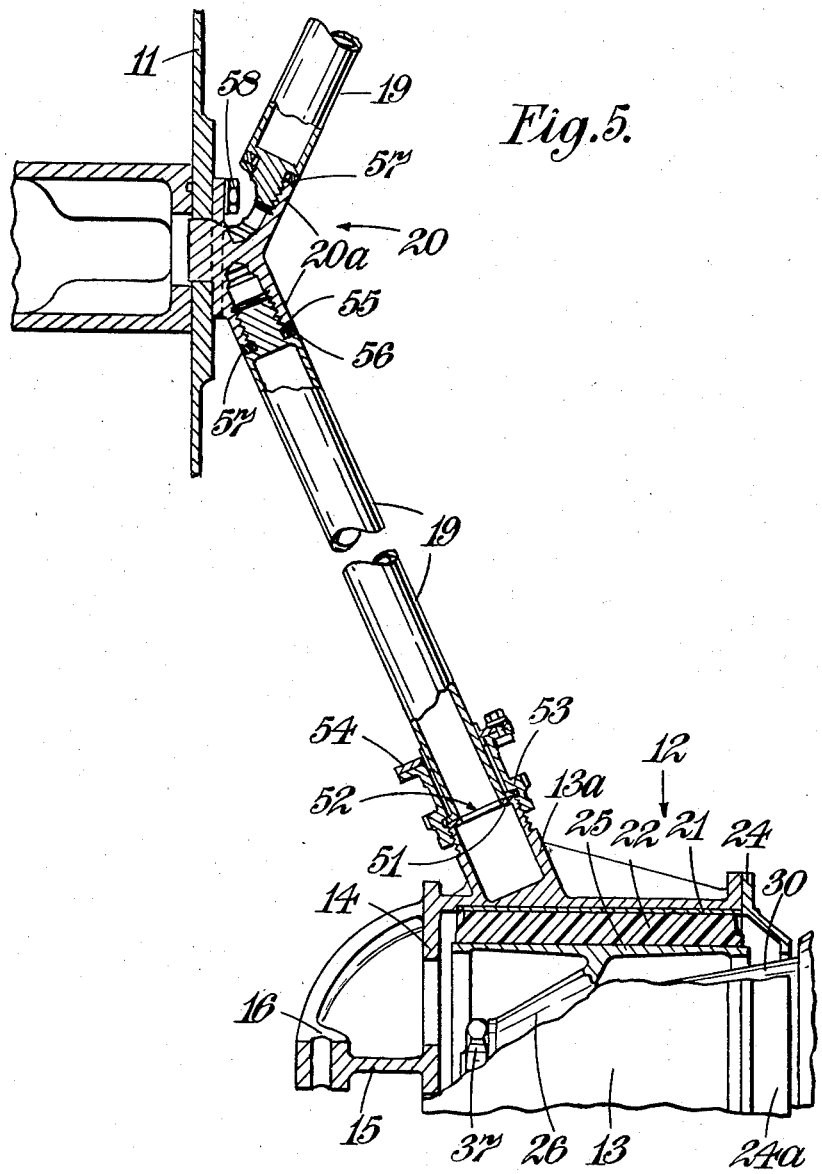

One construction of engine mounting according to this invention will now be described with reference to the accompanying drawings, in which:

Figure 1 illustrates diagrammatically an engine mounted in supporting structure in an aircraft, Figure 2 illustrates partly in section the construction of one form of mounting device, Figure 3 is a section on the line 3—3 of Figure 2, Figure 4 is a view corresponding to Figure 2 showing a modification of the structure shown in Figure 2, Figure 5 is a view showing in section, with part cut away, further details of the form of mounting device, Figure 6 is a view to a larger scale of the joint between two parts shown in Figure 5, and Figure 7 is a side elevation of an engine installed in structure by the mounting means of this invention.

Referring first to Figures 1 and 7, the part of an aircraft structure on which a propeller-driving engine is to be mounted is indicated at 10 and the part of the engine having the mounting points is indicated at 11. In one particular case the part 11 is an annular oil tank 11a of the engine 8 which encircles the compressor casing 9 of a propeller-driving gas-turbine engine 8 and the part 10 is a bulkhead in the aircraft structure disposed rearwardly of the oil tank 11. It will be understood that, in this case, part 8a of the engine (not shown in Figure 1, for the sake of clarity) extends rearwardly through the bulkhead 10. The center of gravity of the engine 8 and propeller 7 combined is indicated at C.G. in Figure 7.

The engine is supported from the part 10 through a mounting which comprises four similar mounting devices 12 which are disposed symmetrically about the axis of the engine and are intersected by a single plane transverse to the axis containing the center of gravity C.G., and each of which mounting device is connected to the engine and to the part 10 in a similar manner.

Referring now to Figures 2, 3, 5 and 6, each mounting device 12 comprises a cylindrical sleeve member 13, hereinafter referred to in the description as the first sleeve member, one end of which is closed-off by a wall 14 having projecting from it a flange 15 formed with a bored boss 16 which engages between a pair of lugs 17 formed on the rear surface of the oil tank 11 and receives a pivot pin 18 which also passes through the lugs. The axis of the pivot pin 18 extends through the axis of the engine and the flange 15 is disposed centrally of the wall 14 so that the pivotal axis of the connection between the first sleeve member 13 and the lugs 17 is on the axis of of the first sleeve member.

The first sleeve member 13 is also connected to the engine by a pair of links 19 which extend from the first sleeve member to fittings 20 mounted on the rear wall of the oil tank 11. The links are arranged so that their centre lines intersect at the centres of the mounting devices 12. It will be seen from Figure 1 that the links extend from the first sleeve member 13, one towards each of the adjacent mounting devices 12 and that each fitting 20 has connected to it the ends of two links 19, one from each of the adjacent mounting devices 12.

Each link 19 has a part-spherical connection with the first sleeve member 13 from which it extends, and a part-spherical connection with its associated fitting 20, so that the angular position of the links 19 may be adjusted when the engine is being mounted in the supporting structure. Moreover the length of each of the links 19 is also adjustable.

The part-spherical connection with the first sleeve member 13 is afforded (see Figure 5) by an external part-spherical surface 51 on an externaly screw-threaded boss 13a, against which surface 51 a complementary part-spherical surface 52 on the end of the link 19 is held by a nut member 53 which engages with the screw-threaded boss 13a. The nut member 53 is locked against rotation by having bolted to it an internally-serrated plate 54 which engages with external serrations on the link 19.

Between the link 19 and the fitting 20, the part-spherical connection (Figures 5 and 6) is provided by an external part-spherical surface 55 on a boss 20a having a threaded bore, which surface 55 co-operates with a complementary part-spherical surface 56 on an annular washer 57 surrounding a threaded reduced-diameter part of the link 19, the washer having a plane face abutting a shoulder on the link. The reduced-diameter part of the link 19 engages in the threaded bore of the boss 20a. The screw threads engaging link 19 and boss 20a are of a form permitting small angular adjustment of the link 19 with respect to the boss 20a.

The length of the link may be adjusted by selection of the thickness of the annular washer 57.

Part of the fitting 20 is shown cut away in Figure 5 so that one of the four nuts 58, which engage with studs projecting through the wall 11 of the oil tank to hold the fitting in place, may be seen.

It will be seen that with the above construction each of the first sleeve members 13 may be accurately adjusted in position by varying the length and angular position of its associated links 19 and thereafter locking them.

In operation of the engine, a turning moment on the engine part 11 known as torque reaction is produced. This is resisted by the aircraft structure 10 so that the mounting structure between part 11 and structure 10 is subjected to the torque reaction, and part 11 carrying sleeves 12 tends to rotate relative to structure 10. This movement of sleeves 12 therefore places one of links 19 attached to each sleeve in tension and the other link in compression. These tensions and compressions may be resolved into two components at right angles—a fore-and-aft component and a tangential component.

The fore-and-aft load transmitted through one link 19 to the wall 11 due to torque reaction is substantially balanced by that transmitted through the other link connected to the same fitting 20, and thus the connection between the fitting 20 and the wall 11 is subjected mainly to sheer stress.

Each of the first sleeve members 13 has fitted within it a sheet-metal liner 21 which is bonded to the external surface of a thick annular rubber bushing 22, and the liner 21 and bushing 22 are held axially in position by the liner 21 bearing against a shoulder 23 at one end of the first sleeve member 13 and by a retaining ring 24 which bears on the opposite end of the liner and which is bolted to the first sleeve member 13.

The inner surface of the rubber bushing 22 is bonded to a second sleeve member 25 which is accommodated within the first sleeve member 13.

The second sleeve member 25 is connected with the part 10 of the aircraft structure in the following way. The second sleeve member 25 is provided internally with a frusto-conical flange 26 which is formed on its internal surface with a part-spherical seating 27. The seating 27 co-operates with a part-spherical surface 28 on a collar 29 which is received on a cylindrical portion of a member 30. The cylindrical portion of member 30 is substantially coaxial with the second sleeve member 25 and is provided with an axially-facing shoulder 34 against which bears a washer 35, the collar 29 bearing against the washer 35.

The washer 35 is of selected thickness to permit adjustment of the position of collars 29 of the four mounting devices so that they may be located in a common plane. The second sleeve member 25 is clamped rigidly to the member 30 in operation by means of a nut and bolt, the bolt 36 extending axially through a bore in the member 30 and engaging the nut 37 which has a conical external surface received in a conical bore at the centre of the flange 26 and has a spline connection 38 with the end of the member 30. It will be appreciated that when the nut and bolt are tightened up the spherical surface 27 on the flange 26 is pressed firmly into engagement with the spherical surface 28 on the collar 29, the collar 29 is pressed axially into abutment with the washer 35 and the washer 35 is pressed firmly into engagement with the shoulder 34.

The member 30 is connected with the part 10 by a pair of struts 31 each of which is secured in a corresponding socket 30a on the member 30. The pair of struts 31 which are connected to a member 30, diverge from the member in the axial direction to be secured at their opposite ends in corresponding sockets 32 provided on brackets 33 secured to the part 10 of the aircraft structure.

It will be seen that with this mounting the positions of the first sleeve members can be accurately adjusted with respect to the engine and the positions of the second sleeve members 25 can be accurately adjusted so that the centres of the part-spherical surfaces of collars 29 are all coplanar. Moreover the spherical joints permit the sleeve members 25 to be adjusted so that their axes are parallel.

It will also be seen that with this form of engine mounting the weight of the engine is taken by the thick annular rubber bushing 22 in compression and in tension and the thrust loads are taken by the bushing in shear.

Moreover, it will be understood that the mounting devices 12 have greater flexibility in the direction parallel to their axes, which are parallel to the engine axis, than in the directions at right angles to their axes, that is to say the sleeve members 13, 25 are permitted greater relative movement in the direction parallel to their axes than in the transverse direction by the rubber bushing 22.

This permits rocking of the engine about the center of gravity C.G., which rocking occurs due to vibrational couples arising from rotation of the engine and propeller, in such a manner that angular movement of the engine axis takes place about a point in the transverse plane containing the mounting devices 12, but restricts movement of the engine in any other sense.

The cylindrical arrangement of the rubber bushing 22 gives a very light construction for a given degree of flexibility.

As a safety feature to cater for any possible failure of the rubber bushing 22, the clamping ring 24 is provided with an inward flange 24a, the inner edge of which lies between a shoulder 40 on the member 30 and one end of the second sleeve member 25. Should the rubber bushing fail the axial movement of the first sleeve member 13 is limited by the engagement of the flange 24a either with the shoulder 40 or the end of the second sleeve member 25 so that complete detachment of the engine from the aircraft is prevented.

Referring to Figure 4, there is shown a modification in which the part-spherical-surfaced collar 29 is received on a spigot 41 provided centrally for an internal flange 42 on the second sleeve member 25 and the collar 29 co-operates with a part-spherical surface 43 formed at the free end of the member 30. Otherwise the construction illustrated in Figure 4 is the same as that shown in Figurues 2 and 3. An adjusting washer 35 may be provided between the collar 29 and the flange 42, so that the position of the collars 29 of the four devices may be positioned so that the centres of the part-spherical surfaces are coplanar.

I claim:

1. In an engine installation comprising a gas-turbine engine, a propeller driven by the engine, the engine and propeller together forming a unit, support structure wherein the engine is mounted and mounting means comprising at least three mounting devices distributed symmetrically around the engine to be intersected by a plane which is normal to the engine axis and contains the center of gravity of the engine and propeller unit; a construction of said mounting means wherein each said mounting device comprises a first sleeve member having its axis extending parallel to the engine axis, which sleeve member is pivoted at one end to the engine, a pair of links each of which is adjustable in length, part-spherical connections at the ends of said links connecting the links with the sleeve member and with the engine respectively, a second sleeve member coaxial with the first sleeve member, an annular bushing of elastomeric material having internal and external annular surfaces which are bonded to the second and first sleeve members respectively thereby elastically to connect them together, means rigidly connecting said second sleeve member to the support structure, said means including parts having cooperating part-spherical surfaces whereby the centers are on the axis of the second sleeve member, and clamping means holding the cooperating part-spherical surfaces in firm abutment.

2. Mounting means according to claim 1 wherein the links of the pair of links connecting each first-sleeve member to the engine extend from the first sleeve member one towards each adjacent mounting device.

3. Mounting means according to claim 2 comprising a bracket on the engine angularly intermediate each adjacent pair of the mounting devices, the bracket being connected through the said part-spherical connections to one link of the said pairs of links connecting each of the adjacent pair of mounting devices to the engine.

4. Mounting means according to claim 1 wherein the parts having the cooperating part-spherical surfaces are an internal flange on the second sleeve member and a collar on the support structure.

5. Mounting means according to claim 4 comprising means defining an axially-facing shoulder on the support structure in alignment with the collar, and an adjusting washer of selected thickness disposed between the axially-facing shoulder and the collar.

6. Mounting means according to claim 5 comprising a projecting member projecting from the support structure co-axially within the second sleeve member and having a cylindrical portion carrying the collar and the washer and having the axially-facing shoulder formed thereon at an end of the cylindrical portion.

7. Mounting means according to claim 6 said internal flange having a conical hole therein, and the clamping means comprising a bolt extending through said projecting member, and an externally-conical nut engaging the conical hole in the internal flange and threaded on the bolt, and a spline connecting the nut with the projecting member.

8. Mounting means according to claim 7 comprising a pair of struts supporting said projecting member and extending axially from the projecting member and diverging from the projecting member, the struts being fixed at their ends remote from the projecting member.

9. Mounting means according to claim 1 comprising an internal flange in said second sleeve member, said flange having a central spigot portion, one of said parts having the co-operating part-spherical surfaces being constituted by a collar mounted on said spigot portion, and the other of said parts being constituted by a projecting member projecting from the support structure within the second sleeve member.

10. Mounting means according to claim 9, the central spigot portion having at one end an axially-facing shoulder, and an adjusting washer of selected thickness mounted on the spigot portion between the shoulder and the collar.

11. An engine mounting according to claim 1 wherein each of the links joining the first sleeve member to the engine has its part-spherical connections formed by a part-spherical surface at one end co-operating with a corresponding surface on one of the parts it joins, and carries at its other end a part-spherical-surfaced washer which co-operates with a corresponding surface on the other of the parts joined by the link, said washer having a selected thickness to determine the effective length of the link, there being also means to hold these part-spherical surfaces in contact.

12. An engine mounting according to claim 1, wherein the first sleeve member is fitted with a liner which is bonded to the bushing of elastomeric substance and which is secured in the first sleeve member.

13. An engine mounting according to claim 12, wherein the liner bears at one end on an internal shoulder on the first sleeve member and is secured in position by a retaining ring which bears on the opposite end of the liner and is secured to the first sleeve member.

14. An engine mounting according to claim 1, comprising also a flange on the first sleeve member projecting between and in axially-spaced relation to one end of the second sleeve member and a shoulder on the support structure.

References Cited in the file of this patent

UNITED STATES PATENTS

| | | |
|---|---|---|
| 2,053,078 | Hathorn | Sept. 1, 1936 |
| 2,249,194 | Trott | July 15, 1941 |
| 2,395,143 | Prewitt | Feb. 19, 1946 |
| 2,565,733 | Korsberg | Aug. 28, 1951 |
| 2,598,632 | Zoerlein et al. | May 27, 1952 |

FOREIGN PATENTS

| | | |
|---|---|---|
| 493,328 | Great Britain | Oct. 6, 1938 |
| 606,444 | Great Britain | Oct. 31, 1945 |